No. 646,765. Patented Apr. 3, 1900.
C. O. STEHFEST.
WHEEL FOR BICYCLES.
(Application filed Jan. 23, 1900.)

(No Model.)

Witnesses.

Inventor.
Charles. O. Stehfest.
By Arnold Barlow
Attorneys.

THE NORRIS PETERS CO., PHOTO-LITHO., WASHINGTON, D. C.

UNITED STATES PATENT OFFICE.

CHARLES OSCAR STEHFEST, OF PROVIDENCE, RHODE ISLAND, ASSIGNOR OF ONE-HALF TO WILLIAM M. HARRIS, JR., OF SAME PLACE.

WHEEL FOR BICYCLES.

SPECIFICATION forming part of Letters Patent No. 646,765, dated April 3, 1900.

Application filed January 23, 1900. Serial No. 2,458. (No model.)

*To all whom it may concern:*

Be it known that I, CHARLES OSCAR STEHFEST, of Providence, in the county of Providence and State of Rhode Island, have invented certain new and useful Improvements in Wheels for Bicycles and other Vehicles; and I do hereby declare that the following is a full, clear, and exact description thereof, reference being had to the accompanying drawings, and to the letters of reference marked thereon, which form a part of this specification.

This invention relates to the wheels used on bicycles, automobiles, and like vehicles. It is fully explained and illustrated in this specification and the accompanying drawings.

Figure 1:
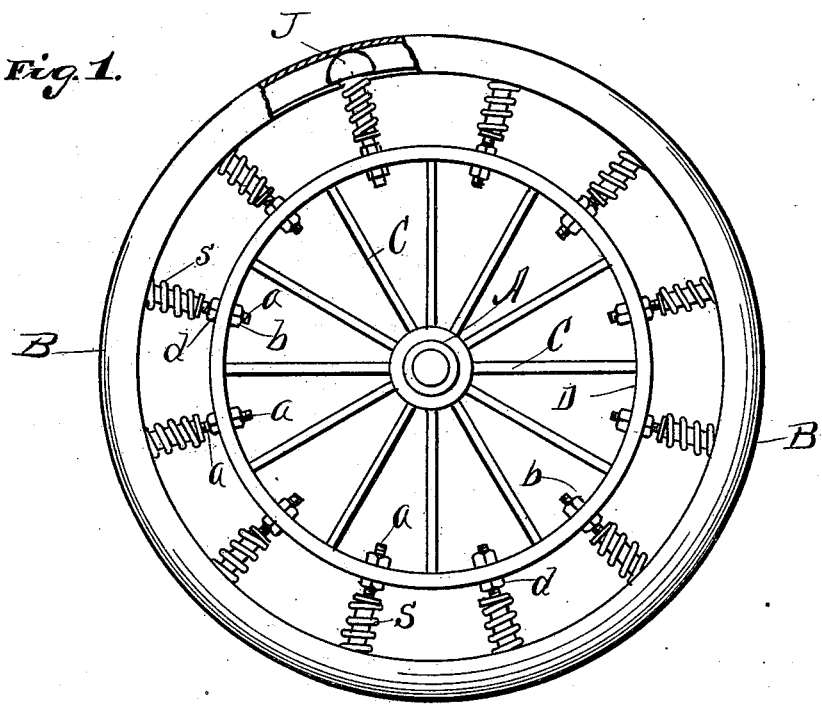
Figure 2:
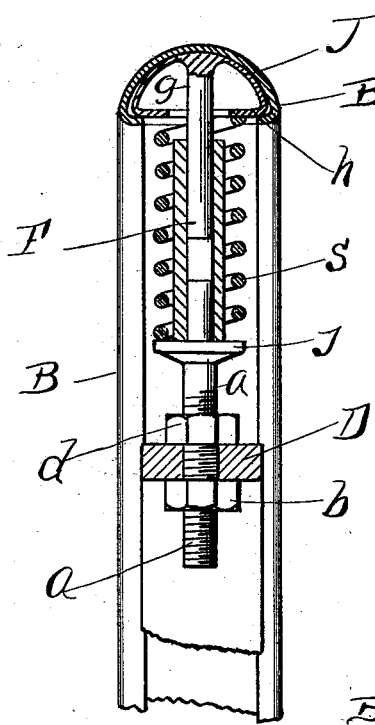

Figure 1 represents a side elevation of the wheel with the improvements. Fig. 2 shows a cross-section of the tire and the spring-bearing devices, partly in section.

The object of the invention is to construct a wheel for use on bicycles, automobiles, and like vehicles that shall be springy and elastic, so as to ride easily over uneven ground or pavements, and not liable to have its elasticity impaired by being punctured or cut by any pointed or sharp object it might pass over, and also so arranged as to be easily adjusted to give an even resistance to compression on all sides.

The construction of the wheel is as follows:

A is the hub of the wheel.

D is a flat inner rim, and C C are spokes each having one end fast in the hub A and the other end fast in the rim D. They may be placed farther apart or nearer together, according to the requirements of the kind of vehicle to which they are applied.

*a a* are a series of short partly hollow spokes which have a screw-thread made on one end and nuts *b d*, fitted to screw on the threaded end. These short spokes *a a* have their threaded end inserted in holes in the rim D, between the ends of the spokes C, with one of the nuts *d* screwed down to the rim on its outer side and the nut *b* on the inside of the rim to hold them fast in place.

The tire B is made of a strip of sheet-steel or other metal rolled up into a semicircular shape in cross-section (see Fig. 2) and having its edges turned in a little way.

The upper part of the short spokes *a* are made hollow either by having a hole bored in from the upper end or, as shown in Fig. 2, by forcing a piece of tubing on against a collar *j*, fast on the spoke, and a pin F, having a hollow hemispherical or semicircular head J, fitting the inside of the tire B, made fast on its upper end. The pin F is fitted to slide easily in the upper part of the spoke *a*, and a stiff open spiral spring S is put on the spoke with the lower end of the spring resting on the collar *j* and the upper end resting on the turned edges of the head T at *h*. The pressure of the heads J against the inside of the tire B can easily be adjusted by means of the nuts *d* and *b*, so as to press more or less on all sides or at any particular part of the tire. It will readily be seen that as the wheel and its load rest on the springs as the wheel revolves the springs will be compressed as they come to the lower side, yielding more or less as the wheels meet obstructions, and in this way prevent sudden jolts and deaden the disagreeable jars that solid wheels are subject to.

Having thus described my improvements, I claim as my invention and desire to secure by Letters Patent—

In a vehicle-wheel the combination of a hub and inner rim, spokes connecting said hub and rim, a series of short hollow spokes adjustably secured to said rim, a hollow tire semicircular in cross-section, pins fitted to slide easily in the hollow spokes and having heads fitted to the inside of said tire, open spiral springs held on said hollow spokes, one end resting on the collars on the spokes and their other ends resting against said head, substantially as described.

In testimony whereof I have hereunto set my hand this 17th day of January, A. D. 1900.

CHARLES OSCAR STEHFEST.

In presence of—
 H. E. BARLOW,
 BENJ. ARNOLD.